United States Patent Office 3,716,513
Patented Feb. 13, 1973

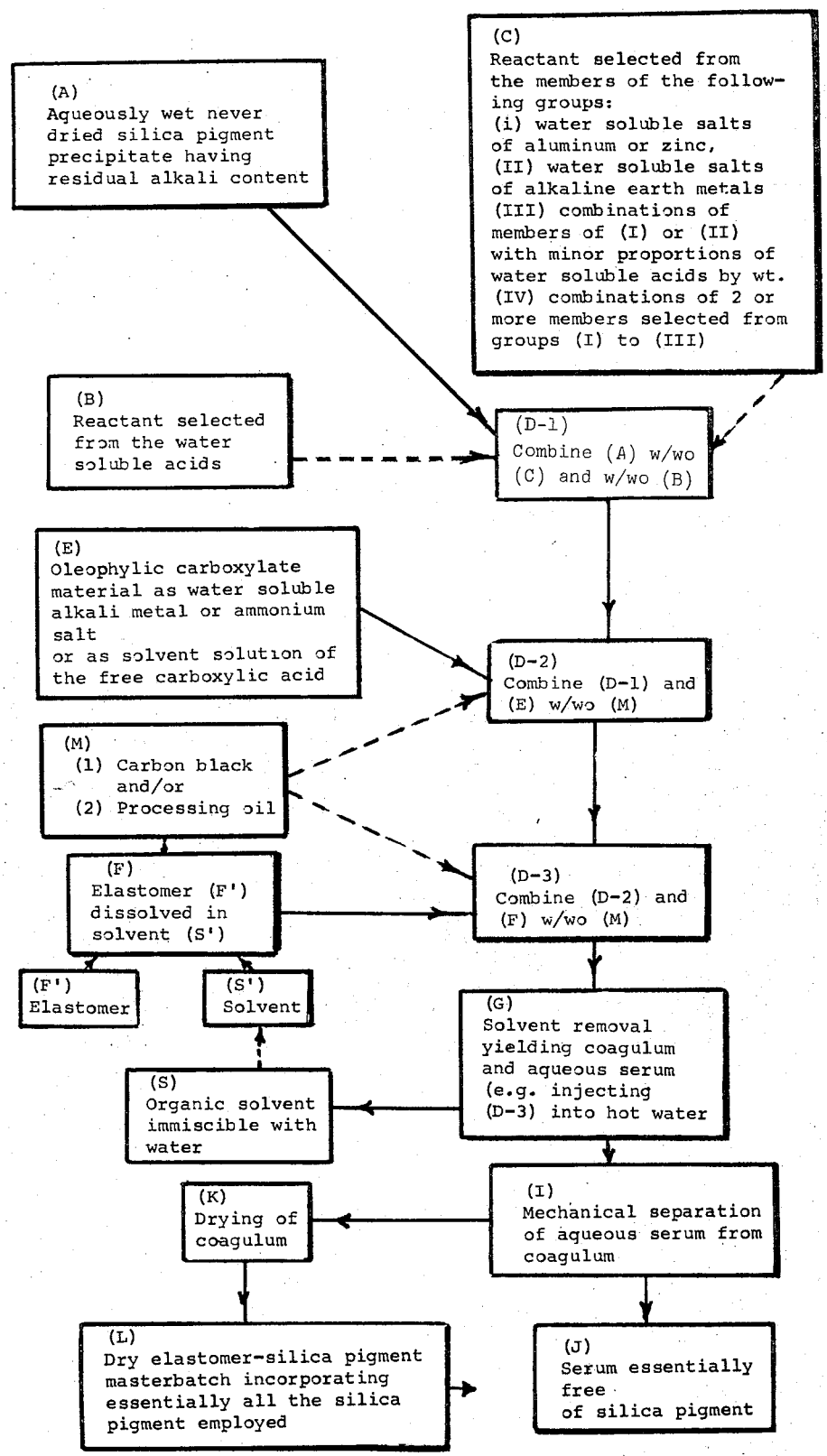

3,716,513
SILICA PIGMENTS AND ELASTOMER-SILICA PIGMENT MASTERBATCHES AND PRODUCTION PROCESSES RELATING THERETO
Oliver W. Burke, Jr., Fort Lauderdale, Fla.
(1510 SW. 13th Court, Pompano Beach, Fla. 33061)
Continuation-in-part of abandoned application Ser. No. 798,215, Sept. 16, 1968, which is a division of application Ser. No. 611,250, Jan. 24, 1967, now Patent No. 3,523,096, which is a continuation-in-part of applications Ser. No. 458,420 and Ser. No. 458,379, both May 24, 1969, both now abandoned, and Ser. No. 479,806, Aug. 16, 1965, now Patent No. 3,401,017. This application July 16, 1970, Ser. No. 55,462
Int. Cl. C08c 11/10; C08k 1/08
U.S. Cl. 260—33.6 AO
14 Claims

ABSTRACT OF THE DISCLOSURE

Curbing of silica pigment losses and the promotion of uniformity of product in the preparation of an elastomer-silica pigment masterbatch are effected (a) by combining (1) an aqueously wet hydrated silica pigment precipitate which has a bound alkali content, which has been prepared by precipitation from an aqueous alkali metal silicate solution, and which has been continuously maintained in an aqueously wet state without having been dried therefrom after its precipitation, with (2) a quantity of oleophilic carboxylate material and (3) with selected coagulant for the carboxylate; (4) combining the resulting treated wet silica pigment with a solvent dispersion of the elastomer, with or without (5) carbon black and/or processing oil, and (b) removing the solvent and aqueous phase and recovering the resulting combination as a masterbatch essentially without loss of silica pigment. A dispersible alkaline silica pigment composition and process for its production are also provided.

CROSS REFERENCE TO RELATED APPLICATIONS

This application is a continuation-in-part of copending application Ser. No. 798,215, filed Sept. 16, 1968, now abandoned, as a division of application Ser. No. 611,250, filed Jan. 24, 1967, now U.S. Pat. 3,523,096, said application Ser. No. 611,250, having been a continuation-in-part of earlier application Ser. No. 458,420, filed May 24, 1965, now abandoned; Ser. No. 458,379, filed May 24, 1965, now abandoned; and Ser. No. 479,806, filed Aug. 16, 1965, now U.S. Pat. 3,401,017, the disclosures of all of which are incorporated herein by reference. Furthermore, this application is directed to a species of invention that was nonelected in applicant's copending application Ser. No. 55,384, filed July 16, 1970, and, pursuant to a restriction requirement, was withdrawn from consideration in that case.

BACKGROUND OF THE INVENTION

Field of the invention

The field to which this invention pertains is the preparation of masterbatches from solvent dispersions of elastomers and aqueous slurries of precipitated silica pigments.

BRIEF DESCRIPTION OF THE DRAWING

The single figure of the drawing is a block-diagram illustrative of the process aspect of the invention.

SUMMARY OF THE INVENTION

It is known to those skilled in the art to prepare hydrated silica pigment for the reinforcement of rubber by precipitation from aqueous solutions of alkali metal silicates with the aid of carbon dioxide, and to carry out such precipitation in manners to avoid the formation of gelatinous masses—(i.e. the formation of silica gel)—and to promote the precipitation of a silica pigment in finely divided form (i.e. in particles in the reinforcing size range of about 0.015 to about 0.150 micron, preferably 0.02 to 0.06 micron) and to recover the pigment from the resulting wet silica pigment by filtration, washing and drying.

The wet silica pigments formed by precipitation from alkali metal silicate solutions with the aid of carbon dioxide have a bound alkali content in the range of about 0.1 to 10% by weight as $Na_2O$, and upon being dried in this state form aggregates, from the pigment particles of reinforcing size, which aggregates are of much greater than reinforcing size and will not adequately disperse (i.e. break down into particles of reinforcing size) when incorporated into rubber either by dry compounding or latex compounding.

When one treats such alkaline wet silica pigments with water soluble salts of alkaline earth metals, e.g. calcium salts, to substantially replace the bound alkali metal of the silica, the resulting pigment, when dried, still evidences the formation of aggregates of greater than reinforcing size, which do not adequately disperse in the rubber.

When one treats the alkaline wet silica pigments with the water soluble salts of aluminum and/or zinc, to substantially replace the alkali metal content thereof, the resulting acidic pigment, when dried, disperses to a greater extent in rubber, evidencing less aggregation than the neutral and alkaline products referred to above.

Finally, when one renders the wet silica pigment strongly acidic, by treatment with sulfuric acid and drying, the resulting strongly acidic product is more readily dispersible in rubber, and exhibits minimum aggregation; however, such highly acidic pigments are not practicable for use in the reinforcement of rubbers, since their acidity adversely affects vulcanization thereof.

Thus the drying of the wet silica pigment in alkaline, neutral, and moderately acidic states, in each instance causes the formation of aggregates of pigment particles to a greater or lesser degree which aggregation prevents adequate dispersion of the dry pigment in the rubber; the formation of these aggregates by the drying of the pigment is irreversible; and they remain mostly as aggregates that do not disperse in the rubber either by dry compounding or latex compounding.

This invention is based on the premise that uniformity of an elastomer-pigment masterbatch depends both on obtaining incorporation of a measured quantity of pigment in the masterbatch (e.g. avoiding loss of pigment in the serum in wet masterbatching) and adequate dispersion of the pigment in the elastomer in particles of reinforcing size (e.g. minimizing the pigment aggregation problem); and the present invention provides a process for accomplishing these ends by forming the masterbatch from aqueously wet hydrated silica pigment precipitate having a bound alkali content of 0.1 to 10% by weight as $Na_2O$; which has been prepared by precipitation from an aqueous solution of alkali metal silicate with the aid of carbon dioxide; and which has continuously been maintained in an aqueously wet state after its precipitation without having been dried therefrom; and which is combined with an elastomer dispersion in the still aqueously wet state, with special provisions for avoiding loss of pigment in the aqueous serum and promoting uniformity of product in the masterbatch. Based on this premise, the present invention, inter alia, provides a simple and efficient process for the curbing of silica pigment losses and the promotion of uniformity of product in the preparation of masterbatches of measured silica pigment content. As shown in the drawing, the first part of the process consists essentially in (A)

providing an aqueously wet never dried hydrated silica pigment precipitate having a residual or bound alkali content; (E) providing a quantity of water soluble oleophilic carboxylate material, and (D)—with or without (w/wo) the addition from (B) of reactant selected from the water soluble acids and/or from (C) of water soluble colorless reactant materials capable of water insolubilizing the oleophilic carboxylate material, and which are selected from the members of the designated Groups (I) to (V)—combining the wet silica pigment from (A) with oleophilic carboxylate material from (E), to form an aqueously wet rubber dispersible hydrated silica pigment compositon. The silica pigment composition so provided, when formed with the oleophilic carboxylate, with or without reactant from (C) and/or processing oil from (M), may be dried to yield useful dispersible dry silica pigment compositions as indicated at (F–1), and in any event, may be used, still without drying, in the second part of the masterbatching process, by combining the same, together with (G) a solvent dispersion (i.e. solution) of elastomer in water immiscible solvent—with or without added carbon black and/or processing oil (M) (1)(2)—with the solvent solution of elastomer (G) and separating the volatiles from the resulting masterbatch as indicated at (H) through (L). The elastomer (G) is dissolved in solvent (S')— which may be recycled solvent (S)—and said solvent itself, or as an azeotrope with water, preferably has a boiling point lower than that of water at atmospheric pressure, and the viscosity of the elastomer-solvent dispersion (i.e. solution) preferably should lie in the range of 5,000 to 50,000 centipoises, as this viscosity facilitates the intimate mixing of the elastomer-solvent solution and the oleophilic wet silica pigment.

The silica-elastomer masterbatch is recovered from the intimately mixed solvent dispersion of elastomer (E) and oleophilic wet silica pigment (D) and may also include from 0 to 65 parts by weight of carbon black with the limitation that the total of silica pigment and carbon black, dry basis, not exceed 100 parts by weight per 100 parts of elastomer by weight, and/or from 0 to 45 parts by weight of processing oil. The recovery is effected by separating the volatiles from the coagulum, preferably in two steps (H) and (I) when the solvent or its aqueous azeotrope can be volatilized in step (H) prior to separation of the solids from the remaining aqueous phase in step (I). The volatizing of the solvent, step (H), to convert the mixture (F) to coagulum and aqueous serum may be effected by running the dispersion (F) into hot water. The greater part of the separation of the coagulum from the aqueous serum in step (I) is preferably effected by mechanical de-watering, e.g. filtration, decanting, centrifuging, etc., to reduce the heat required for final drying of the masterbatch. The serum removed by mechanical dewatering is found to be essentially free of silica pigment as indicated at (J) in the drawing and the dry elastomer-silica pigment masterbatch thus incorporates essentially all of the silica pigment employed. The process thus curbs silica losses and assures a uniform silica pigment content in the masterbatch.

In the following description of preferred embodiments, Examples 1–8 and 24–27 are of the first part of the overall process of (a) preparing the carboxylate material treated silica slurry and dispersible pigment therefrom; and Examples 9–23 and 28–36 are embodiments of (b) the overall masterbatching process.

DESCRIPTION OF THE PREFERRED EMBODIMENTS

In one exemplified embodiment (1a) the aqueous slurry of silica pigment containing bound alkali is pretreated with the reactant, and (1b) water soluble carboxylate material coagulable by such reactant is added to the slurry and precipitated on the wet silica pigment by such reactant (coagulant) and (1c) the so treated aqueous silica slurry is preferably filtered and the filter cake washed to remove excessive amounts of soluble salts, the silica slurry is then mixed into the selected polymer solution with or without the aid of homogenization and (1d) polymer from the solvent solution thereof is deposited on the treated silica of the slurry by evaporation of the solvent therefrom in the presence of the product of step (1b).

In a second exemplified embodiment (2a) the aqueous slurry of silica pigment containing bound alkali is combined with (2b) the water soluble carboxylate material, and (2c) there is then added reactant selected from the water soluble salts of aluminum, zinc and the alkaline earth metals, with or without mineral acid and/or water soluble organic acid, and (2d) the so treated silica slurry is combined with polymer solution, and (2e) polymer from the solvent solution thereof is deposited on the silica of the slurry by evaporation of the solvent therefrom in the presence of the product of step (2b).

In a third exemplified embodiment the alkaline silica pigment is (3a) acidified with mineral acid preferably to a pH of about 4.5 or lower and filtered with or without water washing the filter cake, combined with the (3b) oleophilic carboxylate material and there is added (3c) reactant selected from the water soluble salts of aluminum, zinc and the alkaline earth metals with or without mineral acid and/or water soluble organic acid and (3d) the so treated silica slurry is combined with polymer solution, and (3e) polymer from the solvent solution thereof is deposited on the silica of the slurry by evaporation of the solvent therefrom in the presence of the product of step (3f).

In each of these three embodiments there is produced a coagulum which is separated from the aqueous serum and then dried to yield the silica-elastomer masterbatch.

In Examples 1–8; 24–27, illustrative but not restrictive of the invention, the hydrated silica pigment precipitate has a bound alkali content in the range of 0.1 to 10% by weight as $Na_2O$ and has been prepared by precipitation from an aqueous solution of alkali metal silicate with the aid of carbon dioxide and said silica precipitate has been continuously maintained in the aqueous phase without having been dried after its precipitation, and the aqueous silica pigment is combined with various water soluble oleophilic carboxylate materials and, with or without reagent selected from the class consisting of the members of Group (I) the water soluble salts of aluminum of zinc; Group (II) the water soluble salts of the alkaline earth metals; Group (III) the mineral acids and water soluble organic acids (e.g. acetic or hydroxyacetic acid) and Group (IV) combinations of any two or more of such members.

In these examples the reactants employed were: in Examples 1, 2, 7, 8, 36, aluminum sulfate; in Example 3, zinc sulfate; in Examples 32–35, sulfuric acid, and aluminum sulfate, and in all of the examples sufficient reactant was employed to coagulate a substantial proportion, preferably all, of the water soluble oleophilic material. In Examples 24–27 an alkaline silica was directly combined with the oleophilic material as the free carboxylic acid dissolved in a solvent.

In these examples, the combination of elastomer-solvent dispersion and oleophilic carboxylate treated wet silica pigment was prepared by intimate mixing in the high speed, high shear Waring Blender. The removal of solvent from the intimate mixture of the treated aqueous silica and the rubber-cement was accomplished by injecting the said mixture into water of a sufficient temperature to volatilize the volatile solvent leaving a wet coagulum or wet crumb in the aqueous serum, which serum was free of silica or essentially free of silica.

The elastomers employed in solution in the present invention include, but are not limited to, those prepared by anhydrous polymerization, e.g. with the aid of catalyst systems employing metal alkyls and/or transition metal halides. In certain of these systems after the polymerization of the olefin and/or diolefin is complete and the catalyst has been removed, the elastomer is already in solvent solution or can readily be transferred to a solvent solution suitable for masterbatching as practiced in this invention. In Examples 9–23, 29–34, 36, the polymers are selected from those which are prepared by anhydrous polymerization.

In selecting the solvent the more highly volatile hydrocarbon or halohydrocarbon, or halocarbon solvents are desirable, e.g.: butane, pentane, hexane, cyclohexane, methylene chloride, carbon tetrachloride, and the like.

The invention may be employed to improve wet silica-polymer solution masterbatching and masterbatches, using any alkaline slurry of never dried wet silica pigment containing bound alkali, and is applicable to the formation of masterbatches therewith with elastomer-organic solvent dispersion, i.e. cements, of all solvent soluble elastomers. The solvent cements, dispersions, or solutions employable herein thus include, but are not limited to, the diene homopolymer rubbers such as polybutadiene, polyisoprene, polychloroprene; those of diene copolymer rubbers such as the copolymers of diene monomers and monomers containing and copolymerizable therewith through a single ethylenically unsaturated group, e.g. butadiene-styrene, butadiene-acrylonitrile or methacrylonitrile, butadiene-acrylate or methacrylate ester; and rubbery copolymers of hydrocarbon monomers with polar vinylidene (including vinyl) monomers, elastomers from olefins and/or cyclic olefins and/or cyclic diolefins and/or dicyclic diolefins including the ethylene-propylene copolymers, the ethylene-propylene terpolymers, the ethylene-butylene copolymers and terpolymers, the butadiene-monoolefin interpolymers, the isobutylene-isoprene copolymers, and the like, elastomers from olefin oxides, poly-aromatic ethers and poly-alkyl ethers and other elastomers containing oxygen in the molecule, the fluorohydrocarbon and fluorocarbon elastomers, as well as mixtures and combinations thereof with processing oils, herein referred to as oil-rubber-silica masterbatches, and any of the foregoing further including carbon black, providing the silica pigment comprises an essential component thereof e.g. silica-carbon black-elastomer masterbatches.

Silica pigments containing residual alkali suitable for masterbatching in accordance with the present invention are usually precipitated by the gradual acidulation of aqueous sodium silicate solution, e.g. with the aid of carbon dioxide.

The term "water-soluble acids" as used herein designates the inorganic and organic acids which are water soluble both as free acids and in the form of alkali metal or ammonium salts. Examples of such acids are hydrochloric, sulfuric, nitric, phosphoric, formic, acetic, hydroxyacetic, the chloroacetic acids, propionic, oxalic, tartaric, citric, maleic, and the like.

The term "water soluble oleophilic carboxylate material," as used herein, connotes the water soluble or water dispersible salts of long-chain carboxylic acids, such as the alkali metal and ammonium salts thereof, but does not include the carboxylic acid salts of amines, the employment of which forms the subject of a copending application. The term long-chain carboxylic acids designates the fatty acids and the rosin acids and derivatives thereof, which have from 1 to 10 carboxyl groups and a chain of from 8 to 36 carbon atoms attached to at least one carboxyl group thereof, and such long-chain carboxylic acids include the individual fatty acids such as caprylic, capric, lauric, myristic, palmetic, stearic, oleic, linoleic, linolenic, abietic, hydroabietic, dehydroabietic, ricinoleic, and the like; the mixed fatty acids derived from vegetable oils such as coconut, palm, linseed, cottonseed, soya, tung, perilla, tall, corn, oiticica, and castor oils, and the like; the rosin and disproportionated rosin acids; the mixed fatty acids derived from animal fats such as tallow fatty acids; the mixed fatty acids derived from fish oils, such as herring, menhadden, salmon and sardine oils, and the like; the dimers, trimers, and tetramers of the foregoing unsaturated fatty acids such as the dimer acids from bodied soya bean oil, the trimer acids from bodied linseed oil, and the dimers, trimers and tetramers of fish oil fatty acids; and derivatives of the foregoing such as the partially and totally hydrogenated, hydroxylated, oxidized, epoxidized, halogenated, cyanoated, sulfurated, styrenated, and maleated (maleic anhydride) fatty acids and the like. The saturated carboxylate materials are preferred.

The term "water insoluble oleophilic carboxylate" designates the water insoluble aluminum and/or zinc and/or alkaline earth metal salts and/or the free acid and combinations thereof, derived from the water soluble oleophilic carboxylate material by treatment with reactant in the presence of the silica pigment.

Carbon black

By the term "carbon black" as used herein is meant any carbon blacks suitable for use by the rubber industry and set forth under the title "carbon blacks" at pages 251 to 264 of the publication entitled "Materials and Compounding Ingredients for Rubber," compiled by J. V. Del Gatto, published by Rubber World, 1968, and herein incorporated by reference, e.g. Philblack O (TM), Statex K (TM), Statex 160 (TM), Kosmobile 77 (TM), Thermax (TM), and the like.

Processing oils

The term "processing oils" as used herein is meant rubber processing material of both liquid and solid types (if required the solids types can be converted to the liquid state for use herein with the aid of solvent or plasticizer) and include the processing materials set forth under "Plasticizers and Softeners" at pages 149 to 214 of the publication entitled "Materials and Compounding Ingredients for Rubber," compiled by J. V. Del Gatto, published by Rubber World, 1968, and herein incorporated by reference and among the types of processing materials especially suitable for use in this invention are (a) the coal tar oils and pitches e.g. Bardol (TM), Bardol B (TM); (b) the asphalts, e.g. BRH #2 (TM); (c) the petroleum oils including the paraffinic, naphthenic, aromatic, and highly aromatic categories, which are commercially available under trademark designations, Sunpar (TM), Sundex (TM), Sunthene (TM), Circosol (TM), and Shellflux (TM) oils, and the like, such as Circosol 2XH (TM), Sundex 53 (TM), Shell SPX 97 (TM), Dutrex–20, –419, –726, –757, –787 (TM), and Califlux TT (TM), and other oils suitable for rubber compounding or the oil extension of synthetic rubber; (d) the coumarone-indene oils and resins, e.g. Cumar RH, –P10, –T(TM3; (e) the liquid ester type plasticizers, e.g. dibutyl phthalate, di-(2-ethylhexyl) phthalate, diglycol laurate, dibenzyl sebacate, tributoxyethyl phosphate, tricresyl phosphate and the like; (f) the phenol formaldehyde thermoplastic resins, e.g. Durez 12687, 12707 (TM) and the like; (g) the hydrocarbon resins, e.g. Neville–LX 782, –LX 125, (TM), Para-Flux, Para Resin 2457 (TM); (h) the hydrocarbon resin-coumarone indene polymers, e.g. Picco Resins (TM); (i) the pine tars and pine tar oils, rosin and rosin oils, and tall oil and its derivatives, e.g. PT–101, PT–401, PT–800 (TM); and the like.

EXAMPLES

Silica preparation

The aqueously wet never dried alkaline silica pigment employed in all the examples was prepared in a manner similar to Example 9 of U.S. Pat. No. 3,250,594 except that the ratio of 41° Be commercial sodium silicate $(Na_2O/(SiO_2)_{3.22})$ to water was approximately 1 to 4.5 by weight. The carbon dioxide was supplied to the sodium silicate with the aid of a single submerged combustion burner up to the appearance of the Tyndall effect and with two such burners thereafter. The use of the submerged combustion burners was according to U.S. Pat. No. 3,372,046. The silica product was filtered and washed to reduce the soluble salts to the range of 1 to 2% by weight or less based on the dry solids and the filter cake had a solids of approximately 10% by weight. The resulting aqueously wet silica pigment was designated wet alkaline silica pigment-I, and had a bound and residual alkali content of about 1.5% by weight as $Na_2O$, and a serum pH of about 8.5 (8.5 to 9.5).

A portion of this alkaline silica filter cake was slurried with about a half volume of water and was acidified to a pH of 4.5 with dilute sulfuric acid and as a filter cake, with washing to a filtrate pH of about 7 to 7.5, had a solids of approximately 10% by weight. The resulting aqueously wet silica slurry was designated wet silica pigment-II.

The just described filter cakes having a solids content of about 10% by weight are embraced within the term "wet silica pigment" (which herein connotes aqueously wet silica pigment) as are wet pigments of more reduced water content which can be prepared by pressing the said filter cakes, or of augmented water content, e.g. slurries having less than 10% solids content, and the terms "aqueously wet silica pigment" or "aqueously wet state," as employed herein are generic to all such conditions. Thus these terms as employed herein embrace aqueously wet silica pigment materials having a solids content in the range of about 1% to about 65% solids, dry basis, by weight; however, for economy in the practice of the invention wet silica pigments of reduced water content (solids content 8 to 36%) are preferred.

To determine pigment quality a portion of wet silica pigment-II was dried at 105° C., micropulverized and compounded as set forth in Tablet I hereof.

TABLE I

| Compound ingredients: | Quantities (pts. wt.) |
|---|---|
| Butadiene-styrene copolymer [1] | 100 |
| Silica pigment-II dried | 60 |
| Antioxidant, 2,2' - methylene - bis-(4-methyl-6 - t. - butylphenol) | 2.0 |
| Magnesium oxide | 4.0 |
| Paracoumarone-indene resin [2] | 10.0 |
| Zinc oxide | 1.0 |
| N - tert-butyl-2-benzothiazolesulphenamide | 0.75 |
| N,N' - di - o - tolylguanidine | 1.5 |
| Triethanolamine | 1.0 |
| Phthalic anhydride | 0.75 |
| Sulfur | 2.25 |

[1] SBR 1502.
[2] Cumar Resin RH (a trademark product).

The compound was aged over-night remilled and cured for 45 minutes at 287° F.

The physical test data for the respective vulcanizate containing the foregoing silica pigment example is set forth in Table II hereof.

TABLE II

| Silica tested (in vulcanizate) | Silica Pigment-II |
|---|---|
| Hardness (Shore A) | 72 |
| Tensile (p.s.i.) | 3530 |
| Modulus (300%) | 1140 |
| Elong. (percent) | 575 |

In Examples 9–23 and 28–36 the elastomer solvent dispersion and the prepared slurry of oleophilic carboxylate treated silica pigment were blended together, with or without concurrent by blending (or previous blending with the silica pigment) of carbon black and/or processing oil. In these examples the alkaline, neutral, or acidic aqueous silica slurry is treated with the oleophilic material in amounts in the range of 0.1 to 20% by weight based on the silica pigment or, for certain additional effects, in the range of 2 to 20% of the said material based on the silica pigment. It is preferable to employ a silica filter cake, with or without fluidizing by high shear working, for treatment with the oleophilic carboxylate. This minimizes the water to be homogenized into the elastomer-solvent cement. Combining of the oleophilic treated silica slurry and the elastomer-cement is carried out in a high speed, high shear mixer. The solvent is readily removed by injecting the homogenized mix into hot or boiling water. To facilitate recovery, solvents are employed which are immiscible with water and which themselves, or as their azeotropes, boil lower than water at atmospheric pressure or at higher or lower pressures if it is desirable to employ such.

The solvents employed in the examples are typical of the $C_4$ to $C_8$ hydrocarbon solvents, e.g. hexane, benzene and toluene, and of the $C_1$ to $C_4$ halocarbon and halohydrocarbon solvents, e.g. methylene-chloride, and other members of such groups and mixtures thereof may be selected which are suitable for dissolving the elastomers concerned, e.g. butane, pentane, cyclohexane, heptane, octane, xylene, carbon tetrachloride, trichloroethylene, and oxygented solvents immiscible with water.

The processes of the examples are adaptable for either continuous or batch production of the masterbatch. In those instances in which an oil-rubber-silica pigment masterbatch is desired, up to about 45% of oil based on the elastomer is added to the elastomer-solvent cement, preferably with a small amount of ammonium hydroxide to aid dispersion of the oil and the elastomer cement and it will thus be understood that the masterbatch and elastomer dispersion contemplated by the invention may contain a proportion of processing oil. Similarly in Examples 1, 2, 7, 8 and 32–36, any soluble aluminum salt may be substituted for the hydrated aluminum sulfate, e.g. aluminum ammonium sulfate or aluminum sodium sulfate, and the coagulant solution contemplated by the invention may thus comprise minor amounts of ammonium and/or alkali metal salts without detriment to the process. Furthermore the elastomer cement and/or the aqueous dispersion of silica pigment and/or the aqueous reactant solution may contain a small proportion of ammonium hydroxide which appears in certain instances to facilitate practice of the invention. When carbon black is also to be included in the elastomer-silica pigment masterbatch, it may be incorporated as an aqueous slurry along with the slurry of the silica pigment.

In the following tabulations of Examples 1–23 and 28–35 the ingredients (A), (B), (C), etc., are listed in the order of their addition, except where otherwise specifically set forth. These examples were carried out at ambient temperatures, however, more elevated temperatures may be employed, e.g. to accelerate the processing. In these examples, there is combined with (a) an aqueously wet hydrated silica pigment precipitate which has a bound alkali content in the range of 0.1 to 10% by weight as $Na_2O$; which has been prepared by precipitation from an aqueous solution of alkali-metal silicate with the aid of carbon dioxide; and which has continuously been maintained in an aqueously wet state without having been dried therefrom after its precipitation; (b) from 0.1 to 20%, based on the pigment, dry basis by weight, of water soluble oleophilic carboxylate material and sufficient reactant from the class consisting of water soluble acids and water soluble salts of aluminum and/or zinc and/or alkaline earth metals, to react with the alkali content of the pigment and to form a deposit on the pigment by water insolubilizing said oleophilic carboxylate material, thereby to form a wet pigment composition; (c) such wet pigment composition, in any of the examples may be combined from 0 to 45 parts of processing oil per 100 parts of the pigment, dry basis by weight, and, 80 (d) recovering and drying of the solids therefrom yields a dry hydrated silica pigment composition suitable for dry dispersion in elastomer compounding. The addition of the oil after step (F) in the drawing is advantageous as the oil is then readily distributed in a most uniform manner throughout the water insoluble oleophilic carboxylate treated silica pigment composition, and drying thereof yields a uniform product with even more reduced tendency to dust as well as augmented dispersibility in dry elastomers and augmented bulk density.

In Examples 24–27 an alternative procedure is employed for forming a dispersible hydrated silica pigment, wherein the aqueously wet hydrated alkaline silica pigment is essentially neutralized with acidic and/or reactant, and then blended with a solvent solution of the oleophilic carboxylate material in the form of the free acid (i.e. hydrogen carboxylate), followed by vaporization of the solvent and drying to provide a dry silica pigment having an oleophilic carboxylate deposit thereon.

TABLE III

Preparation of Treated Silica Pigment

[Parts by weight]

| Example | 1 | 2 | 3 | 4 |
|---|---|---|---|---|
| (A) Treated silica slurry alkaline silica pigment-I: | | | | |
| Quantity, wet | 2,000 | 2,000 | 2,000 | 2,000 |
| Dry solids basis | 200 | 200 | 200 | 200 |
| pH | 8.5 | 8.5 | 8.5 | 8.5 |
| Water | 150 | 150 | 150 | 150 |
| (B) Oleophilic carboxylate material aqueous solution: | | | | |
| 20% sodium salt of disproportionated rosin acid [1] | 100 | | | |
| 5% sodium stearate | | 200 | 200 | 200 |
| (C) Combine (A) and (B): Blend [2], min | 0.5 | 0.5 | 0.5 | 0.5 |
| (D) Reactant-aqueous solution: | | | | |
| 10% aluminum sulfate [3] | [4] 125 | 125 | | |
| 10% zinc sulfate | | | 115 | |
| 10% calcium chloride | | | | 100 |
| After coagulant added, pH | 4.5 | 4.5 | 6.2 | 7.6 |
| (E) Combine (C) and (D): Blend (X) | X | X | X | X |
| (F) Treated silica-wet cake [5]: | | | | |
| Filter and wash (X) | X | X | X | X |
| Filter cake dry solids, percent | 13.9 | 12.6 | 13.6 | 13.1 |

[1] Dresinate 731 (a trademark product).
[2] Waring Blendor, a trademark product.
[3] Aluminum sulfate=$Al_2(SO_4)_3 \cdot 14H_2O$.
[4] ⅓ coagulant added before step (b).
[5] This filter cake, when dried at 105° C. and micropulverized, forms a dispersible dry silica pigment composition.

NOTE.— The aqueous alkaline silica slurry was placed in a glass container and moderately agitated; then the water was added followed by the aqueous soap solution and then the aqueous coagulant solution was added slowly while continuing agitation, except as modified in Example 1.

TABLE IV

Preparation of Treated Silica Slurry

[Parts by weight]

| Example | 5 | 6 | 7 | 8 |
|---|---|---|---|---|
| (A) Treated silica slurry alkaline silica pigment-I: | | | | |
| Quantity, wet | 2,000 | 2,000 | 2,000 | 2,000 |
| Dry solids basis | 200 | 200 | 200 | 200 |
| pH | 8.5 | 8.5 | 8.5 | 8.5 |
| (B) Reactant-aqueous solution: | | | | |
| 10% sulfuric acid | | | 60 | 63 |
| pH | 8.5 | 8.5 | 7.0 | 5.0 |
| Water | 150 | 150 | 150 | 150 |
| (C) Oleophilic carboxylate material aqueous solution: | | | | |
| 5% sodium stearate | 200 | 200 | 20 | 4 |
| (D) Combine (A) and (B) then (C): Blend [1], (X) | X | X | X | X |
| (E) Coagulant-aqueous solution: | | | | |
| 10% magnesium sulfate | 175 | | | |
| 10% barium sulfate | | 150 | | |
| 10% aluminum sulfate [2] | | | 50 | 50 |
| After coagulant added pH | 7.2 | 7.0 | 4.5 | 4.5 |
| (F) Combine (D) and (E): Blend, (X) | X | X | X | X |
| (G) Treated silica-wet cake [3]: | | | | |
| Filter and wash (X) | X | X | X | X |
| Filter cake dry solids, percent | 13.5 | 13.4 | 12.5 | 124. |

[1] Waring Blendor, a trademark product.
[2] Aluminum sulfate=$Al_2(SO_4)_3 \cdot 14H_2O$.
[3] This filter cake, when dried at 105° C. and micropulverized, forms a dispersible dry silica pigment composition.

NOTE.—The aqueous alkaline silica slurry was placed in a glass container and moderately agitated, then in Examples 7 and 8 acid was added and in all examples water was added followed by the aqueous soap solution and then the aqueous coagulant solution was added slowly while agitating.

TABLE V

Polymer-Silica Masterbatch

[Parts by weight]

| Example | 9 | 10 | 11 | 12 | 13 |
|---|---|---|---|---|---|
| (A) Polymer solution: | | | | | |
| (a) Polymer: | | | | | |
| Isobutylene-isoprene [1] | 10 | | | | |
| Ethylene-propylene terpolymer [2] | | 10 | | | |
| Ethylene-propylene [3] | | | 10 | | |
| Butadiene-styrene [4] | | | | 10 | 10 |
| (b) Solvent: | | | | | |
| Hexane | 44 | 90 | | 90 | 90 |
| Benzene | | | 90 | | |
| Antioxidant [5] | 0.2 | 0.2 | 0.2 | 0.2 | 0.2 |
| (c) Solvation condition: | | | | | |
| Temperature ° C | 70 | 70 | 70 | 70 | 70 |
| Time agitated, hrs | 12 | 12 | 12 | 12 | 12 |

See footnotes at end of table.

TABLE V—Continued

| Example | 9 | 10 | 11 | 12 | 13 |
|---|---|---|---|---|---|
| (B) Treated silica pigment-filter cake, Table III: | | | | | |
| Example 1 | 36 | 36 | 36 | 36 | |
| Example 2 | | | | | 40 |
| Dry solids basis | 5 | 5 | 5 | 5 | 5 |
| 10% aqueous ammonia | 2 | | 4 | 4 | 4 |
| (C) Blending (A) and (B): Blender, min.[6] | 2 | 2 | 2 | 2 | 2 |
| (D) Solvent removal[7]: | | | | | |
| Boiling water (X) | X | X | X | X | |
| Silica remaining in aqueous serum | None | None | None | None | None |
| (E) Masterbatch: Dried (105° C.) (X) | X | X | X | X | X |

[1] Butyl rubber.
[2] Nordel 1320 (a trademark product).
[3] EPR-404 (a trademark product) a copolymer of ethylene and propylene.
[4] Solprene 300 (a trademark product), a normal viscosity, non-staining, solution polymerized random 75/25 copolymer of butadiene and styrene.
[5] The antioxidant is s,s'-methylene-bis(4-methyl-6-t.-butylphenol).
[6] Waring Blendor (a trademark product).
[7] The silica-solvated polymer masterbatch is dropped into boiling water to vaporize the solvent and the polymer-silica coagulum was separated from the aqueous serum and dried to yield the silica-elastomer masterbatch.

TABLE VI

Polymer-Silica Masterbatch

[Parts by weight]

| Example | 14 | 15 | 16 | 17 | 18 |
|---|---|---|---|---|---|
| (A) Polymer solution: | | | | | |
| (a) Polymer: Butadiene-styrene[1] | 10 | 10 | 10 | 10 | 10 |
| (b) Solvent: | | | | | |
| Hexane | 90 | 90 | 90 | 90 | 90 |
| Antioxidant[2] | 0.2 | 0.2 | 0.2 | 0.2 | 0.2 |
| (c) Solvation conditions: | | | | | |
| Temperature, °C | 70 | 70 | 70 | 70 | 70 |
| Time agitated, hrs | 12 | 12 | 12 | 12 | 12 |
| (B) Treated silica pigment-filter cake, Table III & IV: | | | | | |
| Example 3 | 38 | | | | |
| Example 4 | | 38 | | | |
| Example 5 | | | 36 | | |
| Example 6 | | | | 37 | |
| Example 7 | | | | | 40 |
| Dry solids basis | 5 | 5 | 5 | 5 | 5 |
| 10.2% aqueous ammonia | 4 | 4 | | | |
| (C) Blending (A) and (B): Blender, min.[3] | 2 | 2 | 2 | 2 | 2 |
| (D) Solvent removal[4]: | | | | | |
| Boiling water (X) | X | X | X | X | X |
| Silica remaining in aqueous phase | None | None | None | None | None |
| (E) Masterbatch: Dried (105° C.) (X) | X | X | X | X | X |

[1] Solprene 300 (a trademark product) a normal viscosity, non-staining, solution polymerized random 75/25 copolymer of butadiene and styrene.
[2] The antioxidant is 2,2'-methylene-bis(4-methyl-6-t.-butylphenol).
[3] Waring Blendor (a trademark product).
[4] The silica-solvated polymer masterbatch is dropped into boiling water to vaporize the solvent and the polymer-silcia coagulum is separated from the aqueous serum and the coagulum dried to yield the silica-elastomer masterbatch.

TABLE VII

Polymer-Silica Masterbatch

[Parts by weight]

| Example | 19 | 20 | 21 | 22 | 23 |
|---|---|---|---|---|---|
| (A) Polymer solution: | | | | | |
| (a) Polymer: | | | | | |
| Ethylene-propylene terpolymer[1] | 10 | | 10 | | |
| Ethylene-propylene[2] | | 10 | | | |
| Butadiene-styrene[3] | | | | 10 | 10 |
| (b) Solvent: | | | | | |
| Hexane | 90 | 90 | | 90 | 90 |
| Benzene | | | 90 | | |
| Antioxidant[4] | 0.2 | 0.2 | 0.2 | 0.2 | 0.2 |
| (c) Solvation conditions: | | | | | |
| Temperature, °C | 70 | 70 | 70 | 70 | 70 |
| Time agitated, hrs | 12 | 12 | 12 | 12 | 12 |
| (B) Treated silica pigment-filter cake, Table IV: | | | | | |
| Example 7 | 40 | 40 | 40 | 40 | |
| Example 8 | | | | | 40 |
| Dry solids basis | 5 | 5 | 5 | 5 | 5 |
| 10.2% aqueous ammonia | 4 | 4 | | | |
| (C) Blending (A) and (B): Blender, min.[5] | 2 | 2 | 2 | 2 | 2 |
| (D) Solvent removal[6]: | | | | | |
| Boiling water (X) | X | X | X | X | X |
| Silica remaining in aqueous phase | None | None | None | None | None |
| (E) Masterbatch: Dried (105° C.) (X) | X | X | X | X | X |

[1] Nordel 1320 (a trademark product) a terpolymer of ethylene, propylene and a non-conjugated diene.
[2] EPR-404 (a trademark product) a copolymer of ethylene and propylene.
[3] Solprene 1260 (a trademark product) a low viscosity, non-staining, solution polymerized random 75/25 copolymer of butadiene and styrene.
[4] The antioxidant is 2,2'-methylene-bis(4-methyl-6-t.-butylphenol).
[5] Waring Blendor (a trademark product).
[6] The silica-solvated polymer masterbatch is dropped into boiling water to vaporize the solvent and the polymer-silica coagulum is separated from the aqueous serum and dried to yield the silica-elastomer masterbatch.

TABLE VIII

Treated Silica Pigment

[Parts by weight]

| Example | 24 | 25 | 26 | 27 |
|---|---|---|---|---|
| (A) Treated silica slurry: | | | | |
| (a) Alkaline silica pigment-I: | | | | |
| Quantity, wet | 1,000 | 1,000 | 1,000 | 1,000 |
| Dry solids basis | 100 | 100 | 100 | 100 |
| pH | 9.0 | 9.0 | 9.0 | 9.0 |
| (B) Reactant-aqueous solution: | | | | |
| 2% sulfuric acid | 150 | 150 | | |
| 2% aluminum sulfate | | | 320 | 320 |
| (C) Oleophilic carboxylate material solvent solution: | | | | |
| Rosin acids (hydrogenated) [1] | 15 | | | |
| Tallow fatty acids | | 20 | | |
| Naphthenic acids [2] | | | 10 | |
| Cocoa fatty acid [3] | | | | 8 |
| Hexane | 35 | | | |
| Benzene | | 25 | 20 | 8 |
| (D) Blend (A) and (B) then (C): | | | | |
| Blender, min.[4] | 0.5 | 0.5 | 0.5 | 0.5 |
| 28% aqueous ammonia | | | 0.2 | 0.2 |
| (E) Treated silica pigment [5]: Dried (105° C.) (X) | X | X | X | X |

[1] Stabelite resin (a trademark product).
[2] Sunaptic acid A (a trademark product) having an acid number, mg.KOH/g. of 172).
[3] Neo Fat 255 (a trademark product).
[4] Waring Blendor (a trademark product). Excessive homogenizing and/or excessive quantities of ammonia can cause after combining with elastomer cement silica to separate when adding the mix to boiling water to remove solvent.
[5] After drying micropulverized.

NOTE.—The treated wet silica pigment of these Examples 24–27, prior to drying, may be intimately blended with a solvent solution of elastomer and on removal of the volatiles then forms a masterbatch as in examples 19 to 23.

TABLE IX

Polymer-Silica Masterbatch

[Parts by weight]

| Example | 28 | 29 | 30 | 31 |
|---|---|---|---|---|
| (A) Polymer solution: | | | | |
| (a) Polymer: | | | | |
| Butadiene-styrene [1] | 200 | | | |
| Butadiene-styrene [2] | | 200 | | |
| Ethylene-propylene-terpolymers [3] | | | 200 | |
| Isobutylene-isoprene [4] | | | | 200 |
| (b) Solvent: | | | | |
| Hexane | | | | 800 |
| Benzene | 1,800 | 1,800 | 1,800 | 1,800 |
| (c) Antioxidant [5] | 4 | 4 | 4 | 4 |
| (d) Solvation conditions [4]: | | | | |
| Temperature, ° C | 60 | 60 | 60 | 60 |
| Time agitated, hrs | 12 | 12 | 12 | 12 |
| (B) Silica slurry: Table VIII set treated silica slurry (B): | | | | |
| Example 24 | 1,050 | | | |
| Example 25 | | 1,045 | | |
| Example 26 | | | 1,030 | |
| Example 27 | | | | 1,016 |
| Dry solids basis | 115 | 120 | 110 | 108 |
| (C) Blending (A) and (B): Blender, min.[6] | 1 | 2 | 2 | 2 |
| (D) Solvent removal [7]: | | | | |
| Boiling water (X) | X | X | X | X |
| Silica in aqueous phase | None | None | None | None |
| (E) Masterbatch: Dried (105° C.) (X) | X | X | X | X |

[1] SB-R 1502, a butadiene-styrene copolymer produced by emulsion polymerization.
[2] Solprene 300, (a trademark product) a normal viscosity non-staining solution polymerized random 75/25 copolymer of butadiene and styrene.
[3] Nordel 1320 (a trademark product).
[4] Butyl rubber Enjay 268 (a trademark product).
[5] Antioxidant is 2,2'-methylene-bis(4-methyl-6-t.-butylphenol).
[6] Waring Blendor (a trademark product).
[7] The treated silica solvated polymer intimate combination is dropped into boiling water to vaporize the solvent and the polymer-silica coagulum is separated from the aqueous serum and dried to yield the polymer-silica masterbatch.

An ancillary aspect of this invention, which is also involved in a companion application filed concurrently herewith, embraces the discovery that by employing augmented amounts of the oleophilic carboxylate, significantly in excess of those which avoid loss of silica when masterbatching, a dry silica pigment may be obtained which is readily dispersible, and which does not itself impart high modulus to the stocks, but which does impart an improved balance of tensile strength and tear or abrasion resistance to the vulcanizate. The said ancillary aspect further embraces the discovery that a vulcanizate combining high modulus, high tensile strength and high tear or abrasion resistance, can be provided by employing a combination of dry silica pigment bearing such augmented amounts of oleophilic carboxylate deposit, together with other reinforcing fillers, e.g. carbon black and/or dry silica pigments having less than such augmented amounts of the oleophilic carboxylate deposit thereon. Said ancillary aspect is claimed in said companion application and therefore is not claimed herein.

EXAMPLES 32–35

Polymer-silica masterbatches may also be prepared containing processing oils and/or carbon black as previously described to obtain oil and/or carbon black containing elastomer-silica pigment masterbatches, without departing from the invention. In such practice, from 0 to 65 parts by weight of carbon black may be employed (with the limitation that the total quantity of silica pigment and carbon black, dry basis, not exceed 100 parts by weight, per 100 parts of the elastomers) and/or from 0 to 45 parts by weight of processing oil may be employed, by combining with the elastomer solvent cement and silica pigment slurry prior to the coagulation thereof by solvent removal. Such combinations may be effected in any suitable way, e.g. the carbon black may be added as an aqueous slurry and the processing oil as an aqueous dispersion perferably with an anionic emulsifying agent and/or ammonium hydroxide.

TABLE X

Polymer-Silica Masterbatch Including Processing Oil and/or Carbon Black
[Parts by weight]

| Example | 32 | 33 | 34 | 35 |
|---|---|---|---|---|
| (A) Silica pigment slurry: | | | | |
| Alkaline silica pigment-I (pH 8.5) | 650 | 200 | 200 | 150 |
| Dry solids basis | 65 | 20 | 20 | 15 |
| Water | 200 | 50 | 50 | 50 |
| (B) Acid reactant-aqueous solution: | | | | |
| 10% sulfuric acid | 22 | 6.8 | 6.8 | 5.1 |
| Silica slurry, pH [1] | 7 | 7 | 7 | 7 |
| (C) Oleophilic carboxylate aqueous solution: | | | | |
| Stearic acid | 1.0 | 0.5 | 0.5 | 0.5 |
| 28% Aqueous ammonia | 0.4 | 0.2 | 0.2 | 0.2 |
| Water | 30 | 15 | 15 | 15 |
| (D) Coagulant-aqueous solution: 2% Aluminum sulfate [2] | 55 | 27 | 27 | 27 |
| (E) Combine (A), (B) then (C) and (D) (X) | X | X | X | X |
| Filtered (X) | X | X | X | X |
| Wet cake | 548 | 159 | 159 | 120 |
| (F) Carbon black-processing oil emulsion: | | | | |
| (1) Carbon black: | | | | |
| Carbon black [3] | | 45 | 45 | 40 |
| 28% aqueous ammonia [4] | | 0.5 | 0.5 | 0.5 |
| (2) Processing oil: | | | | |
| Processing oil [5] | 20 | 20 | 10 | |
| Stearic acid | | 1 | | |
| 28% aqueous ammonia | 5 | | | |
| (G) Combine (E) and (F): Blend [6], min | 0.5 | 0.5 | 0.5 | 0.5 |
| (H) Polymer solution: | | | | |
| (a) Polymer: | | | | |
| Isobutylene-isoprene [7] | 100 | | | |
| Ethylene-propylene terpolymer [8] | | 100 | | |
| Ethylene-propylene [9] | | | 100 | |
| Butadiene-styrene [10] | | | | 100 |
| (b) Solvent: | | | | |
| Hexane | 440 | 900 | | 700 |
| Benzene | | | 1,300 | 200 |
| Antioxidant [11] | 2.0 | 2.0 | 2.0 | 2.0 |
| (I) Combine (G) and (H): Blend,[6] min | 1 | 1 | 1 | 1 |
| (J) Solvent removal: [12] | | | | |
| Boiling water (X) | X | X | X | X |
| Silica remaining in aqueous serum | None | None | None | None |
| (K) Masterbatch: Dried (105° C.) (X) | X | X | X | X |

[1] Filter cake after washing.
[2] Aluminum sulfate=Al₂(SO₄)₃.14 H₂O.
[3] Philblack O (a trademark product).
[4] Carbon black blended with wet treated silica then ammonia added to smooth out dispersion.
[5] Sundex 2XH (a trademark product).
[6] Waring Blendor (a trademark product).
[7] Butyl rubber.
[8] Nordel 1320 (a trademark product).
[9] EBP-404, (a trademark product) a copolymer of ethylene and propylene.
[10] SBR-1502 a copolymer of butadiene and styrene produced by aqueous emulsion polymerization.
[11] The antioxidant is 2,2'-methylene-bis(4-methyl-6-t.-butyphenol).
[12] The treated silica with or without carbon black and/or processing oil in combination with solvated polymer is dropped into boiling water to vaporize the solvent and the silica-(black and/or oil)-polymer coagulum is separated from the aqueous serum and dried to yield the silica-elastomer masterbatch.

EXAMPLE 36

The precursor silica pigment for the following example was prepared in a concrete reactor according to my copending application Ser. No. 458,483, filed May 24, 1965, using low shear agitation according to my U.S. application Ser. No. 418,131, filed May 24, 1965, and employing a submerged combustion burner in accordance with my U.S. application U.S. Ser. No. 458,132, filed May 24, 1965, and further utilizing the rate change procedure in accordance with U.S. Pat. No. 3,250,594.

Charged to the reactor were 405 lbs. of 41° Bé. aqueous sodium silicate containing alkalinity 8.9% as $Na_2O$ and 27.7% $SiO_2$, and also charged were 1800 lbs. of water, and the temperature was raised to 70° C. and maintained at the value. Carbon dioxide as acidulating agent was introduced at a constant rate for 220 minutes, at which time the Tyndall effect appeared, and the constant rate was then doubled, and after 555 minutes the acidulation achieved was 102% of that theoretically necessary to convert the alkalinity to $Na_2CO_3$, and thereafter over a period of four hours addition of carbon dioxide was continued, raising the achieved acidulation to approximately 120% of theoretical, conditions of low shear agitation being maintained throughout.

The resulting silica pigment slurry was filtered and washed, yielding a filter cake containing 11% solids, dry basis. A sample of this filter cake slurried with an equal weight of water was filtered and the filtrate had a resistivity of 1250 ohm-centimeters.

For use in this example 5450 gram portion of this washed filter cake containing 600 grams of silica pigment, dry basis, was slurried with 500 ml. of water and 150 ml. of 10% sulfuric acid was added, resulting in a pH of 7.0 of the aqueous serum of the silica slurry. There were then added to this slurry 150 ml. of a 10% aqueous solution of aluminum sulfate as $Al_2(SO_4)_3 \cdot 12H_2O$. The resulting slurry had a pH of the liquid of 4.0, and on filtering produced a wet cake containing 12.8% solids, dry basis, i.e. a cake containing 6.84 parts of retained free water for each part of pigment, dry basis.

A 1440 gram portion of the so prepared wet silica pigment filter cake was subjected to mechanical fracture by 10 minutes agitation in the Waring Blendor at high speed setting. To the resulting processed wet silica pigment was then added while mixing 18.5 grams of sodium oleate dispersed in 300 ml. of water, and 370 grams, dry basis, of rubber in solvent solution which has been prepared by mixing for 24 hours 370 grams of sheeted out butyl rubber (Thiokol Type 165) and 6500 grams of methylene chloride and 5 grams of antioxidant 2246 and homogenizing the same for 3 minutes in the Waring Blendor at high speed setting. To recover the masterbatch the wet silica pigment slurry rubber-solvent blend was run into 3 liters of boiling water which flashed off the methylene chloride for recovery, and the resulting wet masterbatch collected as a coagulum in the water and was separated from the aqueous serum. The aqueous serum was free of silica pigment.

The masterbatches prepared in accordance with the present invention may be compounded with vulcanizing ingredients and vulcanized by any suitable recipe (e.g. the recipe set forth in Table I, above) to form useful vulcanizates.

From the foregoing disclosure, it will be appreciated, inter alia, that the present invention improves elastomer-silica pigment masterbatches by employing silica pigments combined with specified materials to improve the compatability of the said pigments with elastomer materials in general.

In certain co-pending applications filed concurrently herewith, different modes of improving elastomer-silica pigment masterbatches are provided by employing elastomers supplied with certain substituent groups improving the compatability of the elastomers with the aqueously wet silica pigments.

To maintain clear lines of division between the co-pending applications, the claims of this application recite, and rely for patentability on, only its own improvements, without prejudice to their applicability to processes or products employing such improvements along with a different improvement disclosed in one of said co-pending applications.

Also, while there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:

1. A process for the curbing of silica pigment losses and the promotion of uniformity of product in the preparation of a silica pigment-elastomer masterbatch from
   (a) aqueously wet hydrated silica pigment, and
   (b) an elastomer;
which process comprises the steps of:
   (c) providing an organic solvent dispersion of the elastomer containing (1) 100 parts of the elastomer by weight, and (2) the solvent of which is essentially water immiscible,
   (d) providing an aqueous slurry containing 5 to 75 parts by weight, dry basis, of hydrated silica pigment precipitate which has a bound alkali content in the range of 0.1 to 10% by weight as $Na_2O$; which has been prepared by precipitation from an aqueous solution of alkali-metal silicate with the aid of carbon dioxide and filtered and washed; and which has continuously been maintained in an aqueous phase without having been dried after its precipitation;
   (e) providing a quantity of from 0.1 to 20% by weight, based on the silica pigment referred to in step (d), of water-soluble oleophilic carboxylate material selected from the groups consisting of alkali metal and ammonium salts of carboxylic acids;
   (f) providing when used in step (h) reactant material selected from the water soluble acids;
   (g) providing reactant material selected from the class consisting of the members of the following groups: Group (I) the water soluble salts of aluminum or zinc; Group (II) the water soluble salts of the alkaline earth metals; Group (III) combinations of members of Group (I) or (II) with a minor proportion by weight of water soluble acid; and Group (IV) combinations of 2 or more members selected from Groups (I), (II) and (III);
   (h) combining the wet silica pigment provided by step
   (d) with reactant material selected from those provided in steps (f) and (g) in an amount in the range of from 0 to a stoichiometric equivalent of the alkalinity of the said pigment, thereby providing a wet silica pigment for use in step (i);
   (i) combining the wet silica pigment provided by step (h) with the water soluble oleophilic carboxylate provided by step (e) and with sufficient of the reactant provided by step (g) to cause deposition of water insoluble oleophilic carboxylate therefrom on the silica pigment;
   (j) intimately mixing the solvent dispersion of elastomer provided by step (c) with (1) the treated silica pigment slurry prepared by step (g), (2) from 0 to 65 parts by weight of carbon black with the limitation that the total of silica pigment and carbon black, dry basis, not exceed 80 parts by weight and (3) from 0 to 45 parts by weight of processing oil, and
   (k) removing the solvent and aqueous phase and recovering the resulting combination as a masterbatch, whereby there is formed a masterbatch containing essentially all of the silica pigment employed in step (h).

2. A process as claimed in claim 1, in which the solvent employed in step (c) itself or as an aqueous azeotrope has a boiling point lower than that of water at atmospheric pressure, and in which step (k) is effected by volatilizing solvent from the intimate mixture to convert said mixture to coagulum and aqueous serum, and then separating the coagulum from the serum as a masterbatch.

3. A process as claimed in claim 1, wherein at least a part of the reactant employed to cause deposition of water insoluble carboxylate in step (i) is supplied as a stoichiometric excess in step (h).

4. A process as claimed in claim 1, in which the elastomer consists essentially of polymer prepared by essentially anhydrous polymerization.

5. A process as claimed in claim 4, in which at least 5 parts by weight of carbon black are employed in step (j).

6. A process as claimed in claim 4, in which at least 5 parts by weight of processing oil are employed in step (j).

7. A process for the curbing of silica pigment losses and the promotion of uniformity of product in the preparation of a silica pigment-elastomer masterbatch from
   (a) aqueously wet hydrated silica pigment, and
   (b) an elastomer;
which process comprises the steps of:
   (c) providing an organic solvent dispersion of the elastomer containing (1) 100 parts of the elastomer by weight, and (2) the solvent of which is essentially water immiscible,
   (d) providing an aqueous slurry containing 5 to 75 parts by weight, dry basis, of hydrated silica pigment precipitate which has a bound alkali content in the range of 0.1 to 10% by weight as $Na_2O$; which has been prepared by precipitation from an aqueous solution of alkali-metal silicate with the aid of carbon dioxide and filtered and washed; and which has continuously been maintained in an aqueous phase without having been dried after its precipitation;
   (e) providing a quantity of from 0.1 to 20% by weight, based on the silica pigment referred to in step (d), of oleophilic carboxylate material as a solvent solution of the free carboxylic acid;
   (f) providing when used in step (h) reactant material selected from the water soluble acids;
   (g) providing when used in step (h) reactant material from the class consisting of the members of the following groups: Group (I) the water soluble salts of aluminum or zinc; Group (II) the water soluble salts of the alkaline earth metals; Group (III) combinations of members of Groups (I) or (II) with a minor proportion by weight of water soluble acid; and Group (IV) combinations of 2 or more members selected from Groups (I), (II) and (III);

(h) combining the wet silica pigment provided by step (d) with reactant material selected from those provided in steps (f) and (g) in an amount stoichiometrically equivalent to the alkalinity of the said pigment, thereby providing a wet silica pigment for use in step (i);

(i) combining the wet silica pigment provided by step (h) with the oleophilic carboxylate provided by step (e);

(j) intimately mixing the solvent dispersion of elastomer provided by step (c) with (1) the treated silica pigment slurry prepared by step (g), (2) from 0 to 75 parts by weight of carbon black with the limitation that the total of silica pigment and carbon black, dry basis, not to exceed 80 parts by weight and (3) from 0 to 45 parts by weight of processing oil, and (k) removing the solvent and aqueous phase and recovering the resulting combination as a masterbatch, whereby there is formed a masterbatch containing essentially all of the silica pigment employed in step (h).

8. A process as claimed in claim 7, in which the elastomer consists essentially of polymer prepared by essentially anhydrous polymerization.

9. A process as claimed in claim 7, in which at least 5 parts by weight of carbon black are employed in step (j).

10. A process as claimed in claim 7, in which at least 5 parts by weight of processing oil are employed in step (j).

11. A process for the curbing of silica pigment losses and the promotion of uniformity of product in the preparation of a silica pigment-elastomer masterbatch from
(a) aqueously wet hydrated silica pigment, and
(b) an elastomer;
which process comprises the steps of:
(c) providing an organic solvent dispersion of the elastomer containing (1) 100 parts of the elastomer by weight, and (2) the solvent of which is essentially water immiscible;
(d) providing an aqueous slurry containing 5 to 75 parts by weight, dry basis, of hydrated silica pigment precipitate which has a bound alkali content in the range of 0.1 to 10% by weight as $Na_2O$; which has been prepared by precipitation from an aqueous solution of alkali-metal silicate with the air of carbon dioxide and filtered and washed; and which has continuously been maintained in an aqueous phase without having been dried after its precipitation;
(e) providing a quantity of from 0.1 to 20% by weight, based on the silica pigment referred to in step (d), of water soluble oleophilic carboxylate material selected from the group consisting of alkali metal and ammonium salts of carboxylic acids;
(f) providing a reactant material selected from the water soluble acids;
(g) providing when used in step (h) reactant from the class consisting of the members of the following groups: Group (I) the water soluble salts of aluminum or zinc; Group (II) the water soluble salts of the alkaline earth metals; Group (III) combinations of members of Groups (I) or (II) with a minor proportion by weight of water soluble acid; and Group (IV) combinations of 2 or more members selected from Groups (I), (II) and (III);

(h) combining the wet silica pigment provided by step (d) with reactant material selected from those provided in steps (f) and (g) in an amount in the range of from 0 to a stoichiometric equivalent of the alkalinity of the said pigment, thereby providing a wet silica pigment for use in step (i);

(i) combining the wet silica pigment provided by step (h) with the water soluble oleophilic carboxylate provided by step (e) and with sufficient of the reactant provided by step (f) to cause deposition of water insoluble oleophilic carboxylate therefrom on the silica pigment;

(j) intimately mixing the solvent dispersion of elastomer provided by step (c) with (1) the treated silica pigment slurry prepared by step (g), (2) from 0 to 75 parts by weight of carbon black with the limitation that the total of silica pigment and carbon black, dry basis, not exceed 80 parts by weight and (3) from 0 to 45 parts by weight of processing oil, and (k) removing the solvent and aqueous phase and recovering the resulting combination as a masterbatch containing essentially all of the silica pigment employed in step (h).

12. A process as claimed in claim 11, in which the elastomer consists essentially of polymer prepared by essentially anhydrous polymerization.

13. A process as claimed in claim 12, in which at least 5 parts by weight of carbon black are employed in step (j).

14. A process as claimed in claim 12, in which at least 5 parts by weight of processing oil are employed in step (j).

References Cited

UNITED STATES PATENTS

| | | | |
|---|---|---|---|
| 2,047,128 | 7/1936 | Park | 106—308 N |
| 2,236,296 | 3/1941 | Minich et al. | 134—57 |
| 2,635,057 | 4/1953 | Jordan | 106—308 N |
| 2,821,232 | 1/1958 | Wolf | 152—330 |
| 3,081,276 | 3/1963 | Snyder et al. | 260—33.6 |
| 3,172,726 | 3/1965 | Burke et al. | 23—182 |
| 3,244,660 | 4/1966 | Herold | 260—29.7 |
| 3,250,594 | 5/1966 | Burke et al. | 23—182 |

OTHER REFERENCES

Patton, Temple C.: Paint Flow and Pigment Dispersion, Interscience Pub., New York, 1964, pp. 249–258.

L. T. JACOBS, Primary Examiner

J. H. DERRINGTON, Assistant Examiner

U.S. Cl. X.R.

106—308 N, 308 F; 260—41.5 R, 41.5 A, 41.5 MP